(12) United States Patent
Brunner et al.

(10) Patent No.: US 9,719,529 B2
(45) Date of Patent: Aug. 1, 2017

(54) DEVICES, SYSTEMS, AND METHODS FOR VARIABLE FLOW RATE FUEL EJECTION

(75) Inventors: Douglas Brunner, Bear, DE (US); Manish W. Bajpai, Newark, DE (US); John Adam C. Kinzey, Wilmington, DE (US); Shane Marcks, Chester Springs, PA (US); Ajay K. Prasad, Newark, DE (US); Suresh G. Advani, Newark, DE (US)

(73) Assignee: University of Delaware, Newark, DE (US)

( * ) Notice: Subject to any disclaimer, the term of this patent is extended or adjusted under 35 U.S.C. 154(b) by 893 days.

(21) Appl. No.: 13/983,676

(22) PCT Filed: Feb. 3, 2012

(86) PCT No.: PCT/US2012/023703
§ 371 (c)(1),
(2), (4) Date: Dec. 4, 2013

(87) PCT Pub. No.: WO2012/106564
PCT Pub. Date: Aug. 9, 2012

(65) Prior Publication Data
US 2014/0080016 A1    Mar. 20, 2014

Related U.S. Application Data

(60) Provisional application No. 61/439,143, filed on Feb. 3, 2011.

(51) Int. Cl.
*H01M 8/04*    (2016.01)
*F04F 5/52*    (2006.01)
(Continued)

(52) U.S. Cl.
CPC ............. *F04F 5/52* (2013.01); *F04F 5/466* (2013.01); *H01M 8/04097* (2013.01);
(Continued)

(58) Field of Classification Search
CPC ........ F04F 5/466; F04F 5/52; H01M 8/04097; H01M 8/04164; H01M 8/04388; H01M 8/04753; H01M 8/04156
See application file for complete search history.

(56) References Cited

U.S. PATENT DOCUMENTS

| 2004/0007013 A1* | 1/2004 | Takeuchi | F04F 5/461 62/500 |
| 2004/0103685 A1* | 6/2004 | Yamaguchi | B60H 1/00899 62/500 |
| 2009/0317691 A1* | 12/2009 | Yamada | F04F 5/18 429/444 |

FOREIGN PATENT DOCUMENTS

| JP | 2006-040657 A | 2/2006 |
| JP | 2009-299586 A | 12/2009 |
| RU | 2 426 916 C1 | 8/2011 |

OTHER PUBLICATIONS

International Search Report dated May 17, 2012, application No. PCT/US2012/023703.

* cited by examiner

*Primary Examiner* — Muhammad Siddiquee
(74) *Attorney, Agent, or Firm* — RatnerPrestia

(57) ABSTRACT

Devices, systems, and methods for variable flow rate fuel ejection are disclosed. A variable flow rate ejector comprises primary and secondary inlets, primary and secondary nozzles, and a needle. The primary nozzle is connected to receive a first fluid from the first inlet chamber and transmit the first fluid through a primary nozzle opening. The needle is disposed within the primary nozzle opening and is axially movable to vary an area of primary nozzle opening. The primary nozzle opening and the needle are sized to make the flow of the first fluid have a supersonic speed. The secondary inlet opens into a second inlet chamber positioned outside the primary nozzle opening. A portion of the second fluid is (Continued)

entrained in the flow of the first fluid from the primary nozzle. The secondary nozzle opening is sized to make the flow of the first and second fluids have a subsonic speed.

19 Claims, 5 Drawing Sheets

(51) Int. Cl.
    *F04F 5/46*     (2006.01)
    *H01M 8/04089*     (2016.01)
    *H01M 8/04119*     (2016.01)
    *H01M 8/0438*     (2016.01)
    *H01M 8/04746*     (2016.01)
    *F02M 21/02*     (2006.01)

(52) U.S. Cl.
    CPC ... *H01M 8/04156* (2013.01); *H01M 8/04164* (2013.01); *H01M 8/04388* (2013.01); *H01M 8/04753* (2013.01); *F02M 21/0206* (2013.01)

SECTION C-C
SCALE 1:1

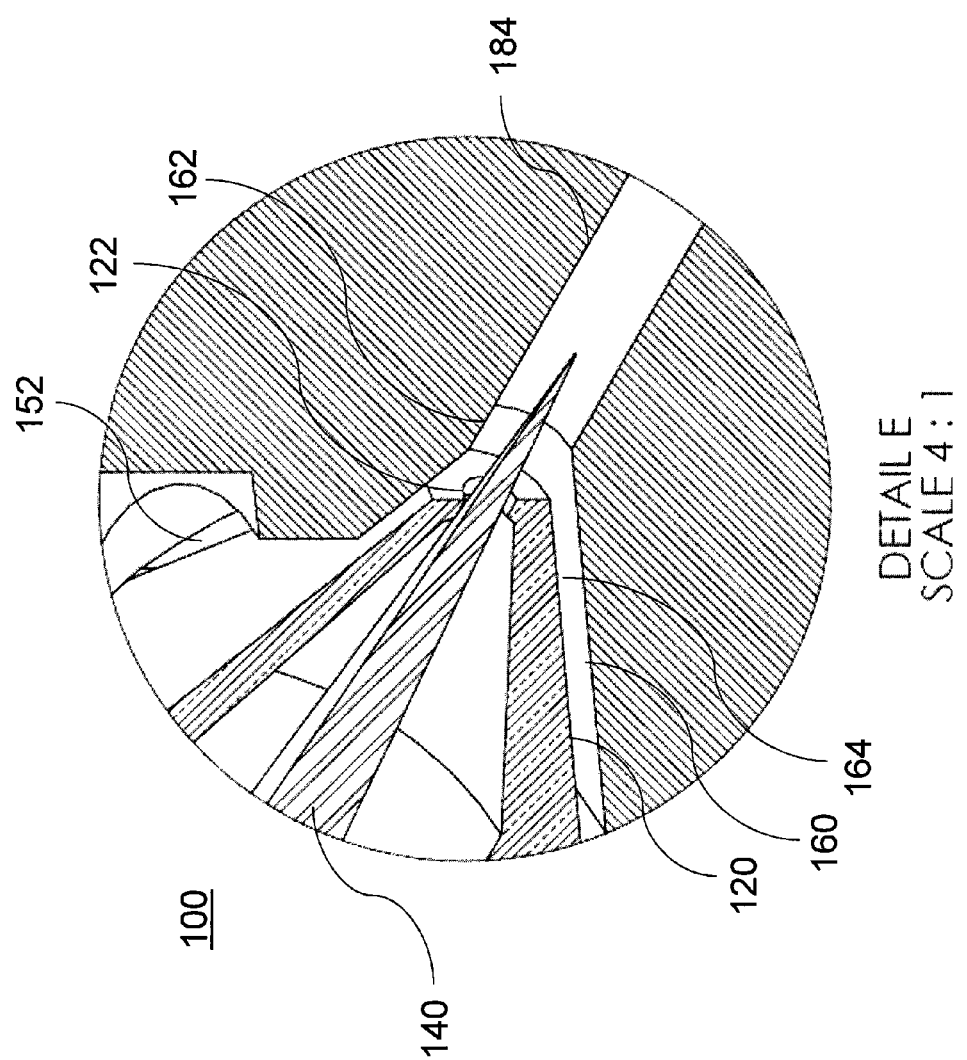

DEVICES, SYSTEMS, AND METHODS FOR VARIABLE FLOW RATE FUEL EJECTION

CROSS REFERENCE TO RELATED APPLICATIONS

This application is the U.S. National Phase application of PCT International Application No. PCT/US2012/023703, filed Feb. 3, 2012, and claims priority to provisional application No. 61/439,143, filed Feb. 3, 2011, which applications are incorporated herein by reference in their entireties and for all purposes.

STATEMENT REGARDING FEDERALLY SPONSORED RESEARCH

The subject matter of the present invention was funded at least in part under Federal Transit Administration Grant No. DE-55-7001-00. The U.S. Government may have certain rights in this invention.

FIELD OF THE INVENTION

The present invention relates generally to fuel ejection, and more particularly, to devices, systems, and methods for variable flow rate fuel ejection.

BACKGROUND OF THE INVENTION

Hydrogen fuel cells generally do not consume all the hydrogen or oxygen supplied to them, as this would allow liquid water and inert gases to accumulate in the areas of the cell that are close to the end of the gas channel, resulting in severe performance loss due to low reactant concentration. Instead, such fuel cells are generally provided with some excess gas. In small systems or research fuel cells, the excess gas may simply be vented for the purposes of simplicity. In a large system (e.g. like that used to power a vehicle), however, the requirements of fuel efficiency necessitate that the excess hydrogen gas be recirculated for later use.

Positive displacement mechanical pumps have generally been used for recirculating hydrogen in a fuel cell system; they are usually of the vane or Roots® blower type. Whatever their mechanical details, they all use some solid moving part to push the hydrogen through the system. The design and operation of such mechanical pumps or blowers, however, is a serious engineering challenge, because the moist hydrogen in fuel cell systems corrodes many common materials (impervious materials are generally limited and/or costly), and the moving parts cannot be lubricated with any oil or grease that might contaminate the fuel cell stack. In addition, such devices require substantial energy to operate, and thus increase the balance-of-plant load, decreasing the overall efficiency of the fuel cell system.

One alternative to the above design includes the use of mechanical diaphragms. Systems that require less pressure differential from fuel cell inlet to outlet, and consequently lower hydrogen supply pressure, may use a dual mechanical diaphragm. Such a system is disclosed in U.S. Pat. No. 6,858,340. The pressure differential between hydrogen and air in the arrangement described in the above-referenced patent, however, generally depends on hydrogen supply pressure and decreases with increasing absolute air pressure.

Another alternative includes the use of fixed geometry ejectors. US Patent Application Publication No. 2008/0118371 refers to an ejector that has many similarities to manually adjustable steam ejectors well-known in engineering practice since at least the early 20th century. The ejector described in the above-described application, however, may only perform adequately or optimally at a specific gas flow rate or within a relatively small range of flow rates. Accordingly, improvements in systems and devices for recirculating hydrogen in fuel cells are desired.

SUMMARY OF THE INVENTION

Aspects of the present invention relate to devices, systems, and methods for variable flow rate fuel ejection.

In accordance with one embodiment of the present invention, a variable flow rate ejector is disclosed. The ejector comprises primary and secondary inlets, primary and secondary nozzles, and a needle. The primary inlet is configured to be connected to a first fluid source at a first pressure. The primary inlet opens into a first inlet chamber. The primary nozzle defines an opening. The primary nozzle is connected to receive the first fluid from the first inlet chamber and transmit a flow of the first fluid through the primary nozzle opening. The needle is disposed within the primary nozzle opening. The needle is axially movable in order to vary an area of primary nozzle opening. The primary nozzle opening and the needle are sized to make the flow of the first fluid through the primary nozzle opening have a supersonic speed when the first fluid source is connected to the primary inlet at the first pressure. The secondary inlet is configured to be connected to a second fluid source at a second pressure lower than the first pressure. The second inlet opens into a second inlet chamber positioned outside the primary nozzle opening. The second inlet chamber is disposed so that at least a portion of the second fluid is entrained in the flow of the first fluid from the primary nozzle, thereby creating a flow of the first and second fluids, when the second fluid source is connected to the secondary inlet at the second pressure. The secondary nozzle defines another opening downstream of the primary nozzle opening. The secondary nozzle opening is sized to make the flow of the first and second fluids through the secondary nozzle opening have a subsonic speed.

In accordance with another aspect of the present invention, a closed-loop fuel cell system is disclosed. The system comprises a fuel cell and a variable flow rate ejector. The fuel cell has an anode circuit, a gas inlet, and a gas outlet. The ejector is a variable flow rate ejector as described above. The primary inlet of the ejector is connected to a hydrogen storage system to receive a high pressure hydrogen gas. The secondary inlet of the ejector is connected to the gas outlet of the fuel cell to receive a low pressure hydrogen gas. The secondary nozzle of the ejector is connected to discharge a flow of the hydrogen gases to the gas inlet of the fuel cell.

In accordance with yet another aspect of the present invention, a method for recirculating hydrogen gas inside a fuel cell system is disclosed. The method comprises operating the above-described fuel cell, generating with the anode circuit a greater quantity of hydrogen gas than is required by a reaction rate of the fuel cell, discharging from the gas outlet of the fuel cell an excess quantity of hydrogen gas, supplying the high pressure hydrogen gas to the primary inlet of the ejector, supplying the excess quantity of hydrogen gas to the secondary inlet of ejector, and controlling the flow of the hydrogen gases from the ejector to the gas inlet of the fuel cell to match the reaction rate of the fuel cell.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. To the contrary, the dimensions of the various features may be expanded or reduced for clarity. Included in the drawings are the following figures:

FIGS. 1B and 1C are diagrams illustrating cross-sectional views of the variable flow rate ejector of FIG. 1A;

DETAILED DESCRIPTION OF THE INVENTION

The various aspects of the present invention relate generally to devices, systems, and methods for various flow rate ejectors. Embodiments of the invention include a device adapted to be inserted into a fluid circulation system and control the flow rate of the fluid in the circulation system.

The devices, systems, and methods described herein are particularly suitable for use in recirculation of hydrogen gas in hydrogen fuel cells. The disclosed systems may be particularly suited for maintaining an optimal flow rate and pressure between the gas outlet and the gas inlet of a fuel cell. Additional details regarding the control of flow rate will be described in greater detail herein.

While the invention is described herein primarily with respect to hydrogen gas recirculation, it will be understood that the invention is not so limited. The disclosed embodiments may be usable for variable flow rate control of fluids in any suitable system.

As set forth above, aspects of the invention relate generally to a novel variable flow rate ejector. The ejector is configured to take high pressure fluid from a first feed and create a supersonic jet of the high pressure fluid that entrains and accelerates a separate low pressure fluid from a second feed. The ejector may then slow down the mixed fluid in a diffuser, and discharge the mixed fluid at a pressure higher than the low pressure fluid. The ejector may be particularly well-suited for use in feeding high-pressure hydrogen from storage tanks supplying a fuel cell system to entrain and re-circulate low-pressure hydrogen returning from the fuel cell stack. The ejector is controlled to maintain the desired pressure in the system using a movable needle in the ejector.

Figure 1A:
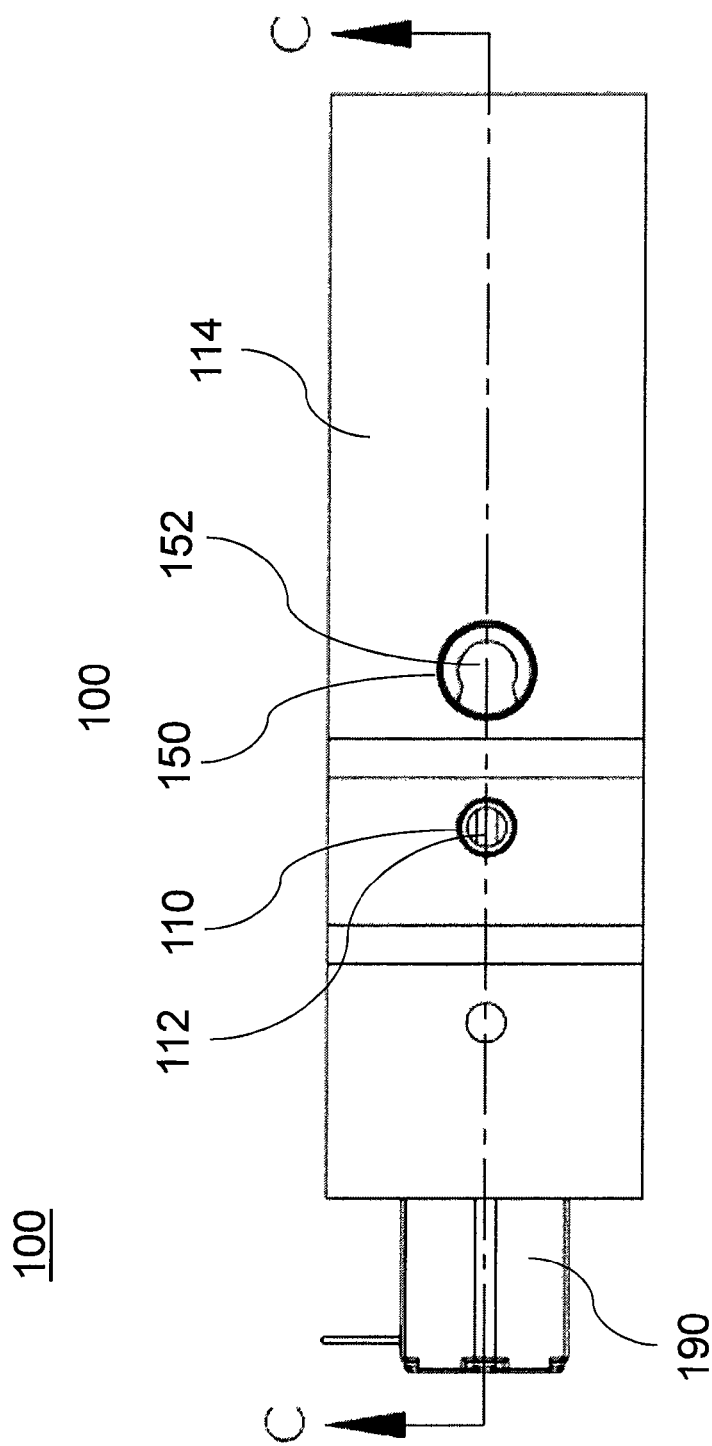
FIG. 1A is a diagram illustrating a top view of an exemplary variable flow rate ejector in accordance with aspects of the present invention.
Figure 1B:
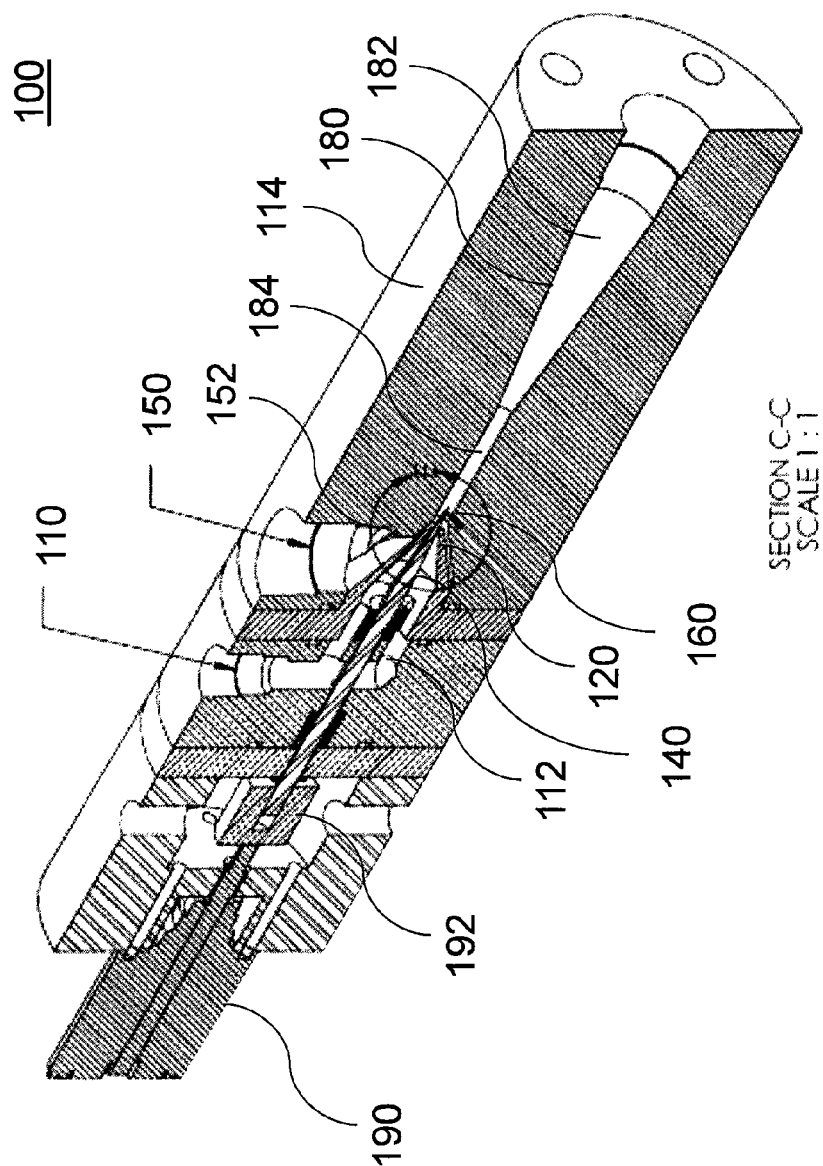

Referring now to the drawings, FIGS. 1A-1C illustrate an exemplary variable flow rate ejector 100 in accordance with aspects of the present invention. Ejector 100 may be particularly suitable for use in recirculation of hydrogen gas in hydrogen fuel cells. As a general overview, ejector 100 includes a primary inlet 110, a primary nozzle 120, a needle 140, a secondary inlet 150, and a secondary nozzle 160. Additional details of ejector 100 are described herein.

Primary inlet 110 is configured to be connected to a first fluid source at a first pressure. Primary inlet 110 opens into a first inlet chamber 112 formed in ejector 100. In an exemplary embodiment, ejector 100 has a cylindrical ejector body 114, as shown in FIGS. 1A and 1B. Ejector body 114 may comprise one or more distinct pieces. Primary inlet 110 is defined in a sidewall of ejector body 114, and first inlet chamber 112 is formed within ejector body 114. The first fluid source may be maintained at a high pressure, such that the first fluid is forced through primary inlet 110 and into first inlet chamber 112. Exemplary materials for forming ejector body 114 include but are not limited to anodized aluminum, acetal, and nickel. Other suitable materials will be known to one of ordinary skill in the art from the description herein.

Primary nozzle 120 is connected to first inlet chamber 112. Primary nozzle 120 defines a primary nozzle opening 122 for restricting the flow of the first fluid through primary nozzle 120. In an exemplary embodiment, primary nozzle 120 is positioned within ejector body 114, as shown in FIGS. 1B and 1C. Primary nozzle 120 may be a separately formed component from ejector body 114, as shown in FIG. 1B, or may be integrally formed into a single piece with ejector body 114. Primary nozzle 120 is connected to receive the first fluid from first inlet chamber 112 and transmit a flow of the first fluid through primary nozzle opening 122. Primary nozzle 122 may be formed from any of the materials described above with respect to ejector body 114.

Needle 140 is disposed within primary nozzle opening 122. Needle 140 is axially movable within primary nozzle opening 122 in order to vary an area of primary nozzle opening 122. In an exemplary embodiment, needle 140 has a conical shape, as shown in FIGS. 1B and 1C. The conical portion changes in cross-sectional area along its axial length. Thus, axial movement of needle 140 changes the cross-sectional area of needle 140 that is positioned in primary nozzle opening 122 at any one time. The area through which the first fluid can flow in primary nozzle opening 122 is dependent on the space between the inner wall of primary nozzle opening 122 and the surface of needle 140. As outlined above, this area may be adjusted by repositioning needle 140. Accordingly, the movement of needle 140 may be controlled to vary the flow rate of the first fluid through primary nozzle opening 122.

The shape of needle 140 is also selected to improve the smoothness of the flow of the first fluid. Regardless of the area of primary nozzle opening 122, the supersonic flow of the first fluid remains attached to needle 140 and then separates cleanly from the pointed end, with minimal turbulence. It may be desirable that needle 140 extend all the way into the opening of secondary nozzle 160 when it is fully extended, as shown in FIG. 1C, in order to further promote smooth flow of the first fluid.

Primary nozzle opening 122 and needle 140 are sized to make the flow of the first fluid through primary nozzle opening 122 have a supersonic speed when the first fluid source is connected to primary inlet 110 at the first pressure. In other words, as mentioned above primary inlet 110 is configured to be connected to a first fluid source at a predetermined first pressure (or range of pressures). The pressure on the first fluid controls the speed at which the first fluid flows through primary nozzle opening 122. Accordingly, in accordance with aspects of the present invention, the size of primary nozzle opening 122 and needle 140 may be selected based on the first pressure, in order to cause the first fluid to travel at supersonic speeds through primary nozzle opening 122. The supersonic speeds may reach or exceed Mach 2. Algorithms for determining an appropriate size for primary nozzle opening 122 and needle 140 based on the first pressure will be understood to one of ordinary skill in the art from the description herein.

Secondary inlet 150 is configured to be connected to a second fluid source at a second pressure. The second pressure is lower than the first pressure. Secondary inlet 150 opens into a second inlet chamber 152 formed in ejector 100. Second inlet chamber 152 is disposed outside of (and downstream of) primary nozzle opening 122. In an exemplary embodiment, second inlet chamber 152 is formed within ejector body 114, as shown in FIGS. 1B and 1C. The second fluid source may be maintained at a low pressure relative to the first fluid source. The flow of the first fluid through primary nozzle opening 122 draws second fluid through secondary inlet 150. In particular, the supersonic flow of the first fluid creates a static pressure at needle 140 lower than the second gas pressure. Accordingly, when the second fluid source is connected to secondary inlet 150 at the second pressure, at least a portion of the second fluid is entrained in the flow of the first fluid from primary nozzle 120, thereby creating a flow that includes both the first and second fluids.

Secondary nozzle 160 is connected to second inlet chamber 152. Primary nozzle 120 defines a secondary nozzle opening 162 downstream of primary nozzle opening 122. In an exemplary embodiment, secondary nozzle 160 is positioned within ejector body 114, as shown in FIGS. 1B and 1C. Secondary nozzle 160 may be a separately formed component from ejector body 114, or may be integrally formed into a single piece with ejector body 114, as shown in FIG. 1C. Secondary nozzle 160 is connected to receive the flow of first and second fluids from second inlet chamber 152 and transmit the flow of first and second fluids through secondary nozzle opening 162. As shown in FIG. 1C, secondary nozzle 160 has a converging section 164 extending from the outlet of primary nozzle opening 122 to secondary nozzle opening 162. In an exemplary embodiment, converging section 164 has a conical shape, with an angle between the side of the cone and the centerline of approximately 30 degrees.

Secondary nozzle opening 162 is sized to make the flow of the first and second fluids through secondary nozzle opening 162 have a subsonic speed. In other words, as mentioned above, the flow of first fluid through primary nozzle opening 122 has a supersonic speed, which is determined based on the size of primary nozzle 122 and needle 140. The second fluid in second inlet chamber 152 is entrained in this flow to create a flow of first and second fluids. Accordingly, The size of secondary nozzle opening 162 may be selected based on the size of primary nozzle 122 and needle 140, and the second pressure, in order to cause the first and second fluids to travel at subsonic speeds through secondary nozzle opening 162.

The distance between secondary nozzle opening 162 and primary nozzle opening 122 may be kept small in order to limit the production of eddies or turbulence in the flow of first fluid between the primary nozzle opening 122 and the secondary nozzle opening 162. In an exemplary embodiment, the distance from the outermost (i.e. downstream) edge of primary nozzle opening 122 to an innermost (i.e., upstream) edge of secondary nozzle opening 162 is less than the diameter of secondary nozzle opening 162.

As set forth above, the subsonic speed of the flow of first and second fluids may be controlled based on the size of the secondary nozzle opening 162 relative to the primary nozzle opening 122. In an exemplary embodiment, the secondary nozzle opening has a diameter from one to five times a diameter of the primary nozzle opening, in order to achieve a flow of first and second fluids at a subsonic speed.

The subsonic speed may be selected to be very close to the speed of sound, Mach 1, at the highest designed rate of flow of ejector 100. This may be desirable in order to limit the production of eddies or turbulence in the flow of first and second fluids through secondary nozzle opening 162. In an exemplary embodiment, the subsonic speed of the flow of first and second fluids is approximately 90% of Mach 1 when operating at maximum flow.

Ejector 100 is not limited to the above components, but may include alternative or additional components, as would be understood by one of ordinary skill in the art.

Ejector 100 may include a diffuser 180 positioned downstream of secondary nozzle opening 162. Diffuser 180 is configured to discharge the flow of first and second fluids from ejector 100. Diffuser 180 is configured to discharge this flow at a pressure greater than the second pressure (i.e., the pressure of the low pressure fluid). In an exemplary embodiment, diffuser 180 comprises a tapered outer wall 182, as shown in FIG. 1B. Tapered outer wall 182 widens in the direction of flow of the first and second fluids. Accordingly, wall 182 slows the speed of the flow, and lowers the pressure of the first and second fluids.

Where ejector 100 includes diffuser 180, ejector 100 may further include a throat portion 184 extending between secondary nozzle opening 162 and diffuser 180. Throat portion 184 has a constant width along the entire distance between secondary nozzle opening 162 and diffuser 180. In an exemplary embodiment, throat portion 184 comprises an extension of secondary nozzle 160, as shown in FIGS. 1B and 1C.

Throat portion 184 has substantially the same diameter as second nozzle opening 162. Further, as shown in FIG. 1B, throat portion 184 has a length much greater than its diameter. This may be preferable in order to maintain the speed of the flow of first and second fluids, and to limit flow separation or backflow. In an exemplary embodiment, throat portion 184 has a length of at least six times the diameter of throat portion 184.

Ejector 100 may further include means for axially moving needle 140. In an exemplary embodiment, the means comprise an electric stepper motor 190, as shown in FIGS. 1A and 1B. Stepper motor 190 is connected to a linear actuator 192 for moving needle 140 in an axial direction within primary nozzle opening 122. As explained above, because needle 140 partially obstructs primary nozzle opening 122, moving it back and forth with stepper motor 190 may create any desired open nozzle area for controlling the flow rate of the first fluid.

Exemplary measurements for the components of ejector 100 are set forth below. It will be understood by one of ordinary skill in the art that the measurements are set forth merely for the purposes of illustrating one embodiment of ejector 100, and are not intended to be limiting. This embodiment relates to an ejector designed to receive hydrogen gas through the primary inlet 110 at a rate of up to approximately 0.171 mole/second, and to discharge hydrogen gas at a pressure of between approximately 15-18 psig. Primary nozzle opening 122 has a diameter of 0.0625", and needle 140 has a cone half-angle of 5 degrees. When assembled, the gap between the exterior of primary nozzle 120 and the converging section 164 of secondary nozzle 160 is 0.0274." Throat portion 184 of ejector 100 has a diameter of 0.125" and a length of 0.9375". Diffuser 180 has a cone half-angle of 7.5 degrees, with an exit diameter of 0.5625".

Figure 2:
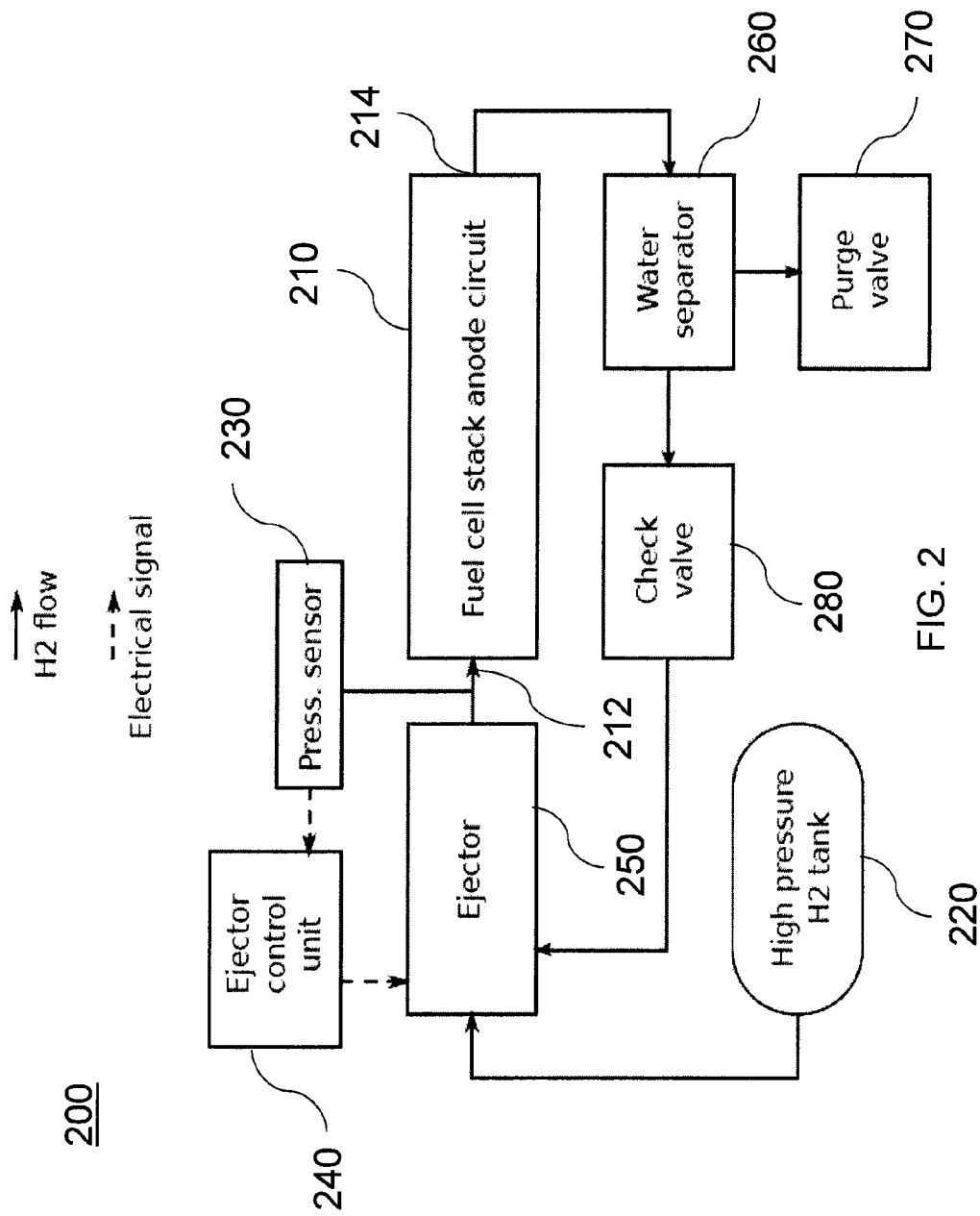
FIG. 2 is a block diagram illustrating an exemplary closed-loop fuel cell system in accordance with aspects of the present invention.

FIG. 2 illustrates an exemplary closed-loop fuel cell system 200 in accordance with aspects of the present invention. As a general overview, system 200 includes a fuel cell 210, and an ejector 250. Additional details of system 200 are described herein.

Fuel cell 210 produces energy through consumption of hydrogen gas. Fuel cell 210 comprises an anode circuit for producing the hydrogen gas for consumption by fuel cell 210. The anode circuit may produce hydrogen gas through a conventional electrolyzing process, as would be understood by one of ordinary skill in the art. Suitable fuel cells for use as fuel cell 210 will be known to one of ordinary skill in the art from the description herein.

Fuel cell 210 further includes a gas inlet 212 and a gas outlet 214, as shown in FIG. 2. As set forth above, it may be desirable to recirculate excess hydrogen gas produced by the anode circuit to ensure that fuel cell 210 operates properly, and to improve fuel efficiency of fuel cell 210. Accordingly, gas inlet 212 and gas outlet 214 form part of a hydrogen gas recirculation loop in system 200. As is explained below, ejector 250 is used to circulate the hydrogen gas within the hydrogen gas recirculation loop.

Ejector 250 is connected to fuel cell 210. In an exemplary embodiment, ejector 250 is a variable flow rate ejector substantially as described above with respect to ejector 100. In this embodiment, the inlets and outlet of ejector 100 may be connected to components of system 200 as described below.

Primary inlet 110 of ejector 100 is connected to a hydrogen storage system 220. Hydrogen storage system 220 corresponds to the first fluid source described above. Hydrogen storage system 220 stores hydrogen gas for consumption by fuel cell 210. Hydrogen storage system 220 is configured to provide high pressure hydrogen gas 220 through the primary inlet 110 of ejector 100.

Secondary inlet 150 of ejector 100 is connected to gas outlet 214 of fuel cell 210. As excess hydrogen gas is produced in fuel cell 210, the excess gas may flow out of the anode circuit through gas outlet 214 at a low pressure. Thus, the fuel cell 210 corresponds to the second fluid source described above. The low pressure hydrogen gas flows into ejector 100 through secondary inlet 150, where it is entrained in the supersonic flow of hydrogen gas from primary nozzle 120. The hydrogen gas from storage system 220 (i.e. the first fluid) and the hydrogen gas from fuel cell 210 (i.e. the second fluid) then flow through secondary nozzle 160, and are discharged from ejector 100.

The secondary nozzle 160 of ejector 100 is connected to discharge the flow of mixed hydrogen gases to gas inlet 212 of fuel cell 210. Where ejector 100 includes diffuser 180, the flow of mixed hydrogen gas is discharged from diffuser 180 to gas inlet 212 of fuel cell 210. Fuel cell 210 may then consume this flow of hydrogen gas from ejector 100 to produce energy.

System 200 is not limited to the above components, but may include alternative or additional components, as would be understood by one of ordinary skill in the art.

System 200 may include a pressure sensor 230 disposed between ejector 250 and gas inlet 212 of fuel cell 210, as shown in FIG. 2. Pressure sensor 230 is operable to sense a pressure of the flow of hydrogen gases from ejector 250 to gas inlet 212. This sensed pressure may be used to vary the flow rate from ejector 250 to match a rate at which fuel cell 210 consumes hydrogen (i.e. a reaction rate of fuel cell 210). Suitable pressure sensors for use as pressure sensor 230 include, for example, the US331-000005-030PG pressure sensor provided by Measurement Specialties of Hampton, Va.

System 200 may further include an ejector control unit 240 in communication with pressure sensor 230 and ejector 250, as shown in FIG. 2. Ejector control unit 240 is configured to axially move the ejector needle to vary the flow rate from ejector 250. In an exemplary embodiment, ejector control unit 240 is programmed to control a motor within ejector 250 to move the ejector needle. Ejector control unit 240 operates the motor in such a way so as to maintain the flow of hydrogen gases from ejector 250 to gas inlet 212 at a predetermined pressure. The predetermined pressure may be selected based on the requirements of fuel cell 210. A suitable processor for use as ejector control unit 240 is a PIC18F1220 microcontroller provided by Microchip Technology Inc. of Chandler, Ariz. Other suitable processors will be known to one of ordinary skill in the art from the description herein.

System 200 may further include a separator 260, a purge valve 270, and a check valve 280. Separator 260 is disposed between gas outlet 214 of fuel cell 210 and ejector 250, as shown in FIG. 2. Separator 260 is configured to separate water from the low pressure hydrogen gas as the flows out from fuel cell 210. Purge valve 270 is connected to separator 260, as shown in FIG. 2. Purge valve 270 is configured to remove the separated water from system 200, i.e., to remove the water from the hydrogen gas recirculation loop. The water may then be vented or reused in the anode circuit of fuel cell 210. Check valve 280 is connected downstream of separator 260, and is operable to prevent any backflow of hydrogen gas from ejector 250 toward fuel cell 210. Suitable components for use as separator 260, purge valve 270, and check valve 280 will be known to one of ordinary skill in the art from the description herein.

Figure 3:
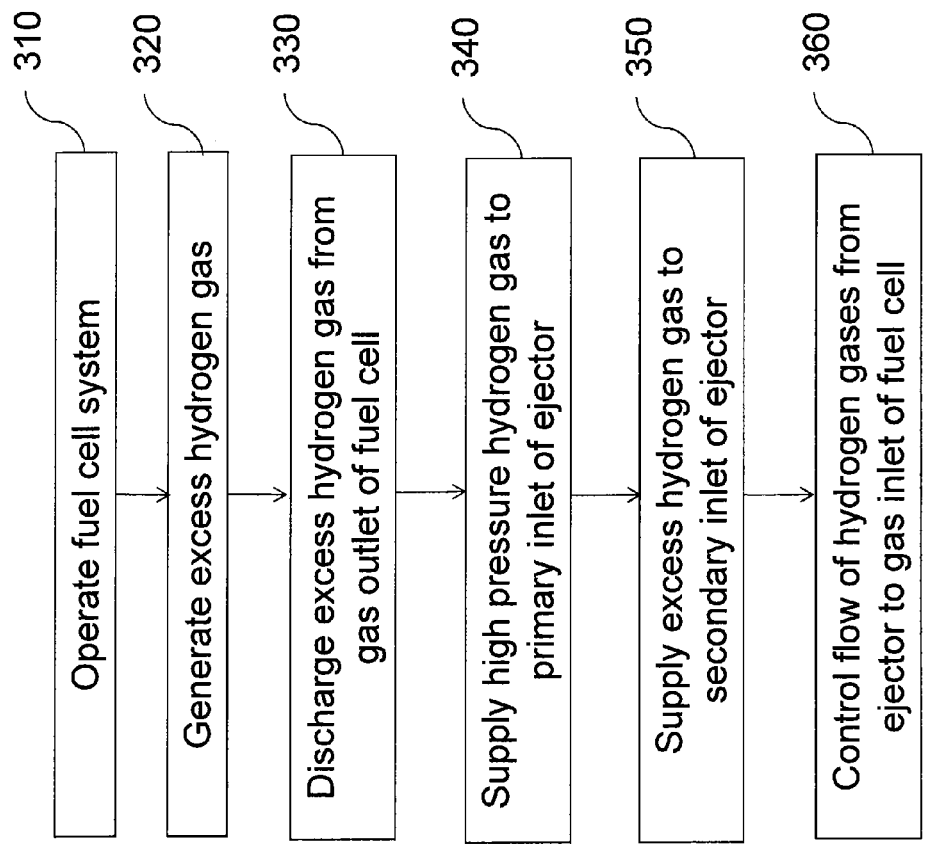
FIG. 3 is a flowchart illustrating an exemplary method for recirculating hydrogen inside a fuel system in accordance with aspects of the present invention.

FIG. 3 is a flowchart illustrating an exemplary method 300 for recirculating hydrogen gas inside a fuel cell system in accordance with aspects of the present invention. As a general overview, method 300 includes operating a fuel cell, generating excess hydrogen gas, discharging the excess hydrogen gas, supplying high pressure hydrogen gas to an ejector, supplying the excess hydrogen gas to the ejector, and controlling the flow of hydrogen gas from the ejector. Additional details of method 300 are described herein with respect to the components of variable flow rate ejector 100 and closed loop fuel cell system 200.

During operation of a fuel cell (step 310), such as exemplary fuel cell system 200, the anode circuit of fuel cell 210 produces hydrogen gas for consumption by the fuel cell. Fuel cell 210 consumes the hydrogen gas to generate energy. The operation of fuel cell 210 will be understood by one of ordinary skill in the art from the description herein. In general, and in the exemplary embodiment discussed herein, the anode circuit generates a greater quantity of hydrogen gas than is required by the reaction rate of fuel cell 210, as illustrated in step 320. Hydrogen gas not consumed by the predetermined reaction rate of fuel cell 210 is referred to as "excess hydrogen gas" for the purpose of this description.

In step 330, the excess hydrogen gas generated by operating the fuel cell is discharged from the gas outlet of the fuel cell. In an exemplary embodiment, excess hydrogen gas is discharged from gas outlet 214 of fuel cell 210. The excess hydrogen gas flows outward through gas outlet 214 at a low pressure.

In step 340, a high pressure hydrogen gas is provided to an ejector. In an exemplary embodiment, hydrogen storage system 220 maintains a source of hydrogen gas at high pressure. In this embodiment, ejector 250 comprises an ejector substantially as described above with respect to ejector 100. Hydrogen storage system 220 supplies the high pressure hydrogen gas to the primary inlet 110 of ejector 100. The hydrogen gas then flows through primary nozzle 120 of ejector 100 at a supersonic speed, as described above with respect to ejector 100.

In step 350, the excess quantity of hydrogen gas is provided to the ejector. In an exemplary embodiment, the excess hydrogen gas from gas outlet 214 is supplied at low pressure to secondary inlet 150 of ejector 100. The low pressure hydrogen gas is then entrained in the supersonic flow of the high pressure hydrogen gas, to form a mixed flow of hydrogen gases. The flow of hydrogen gases then passes through secondary nozzle 160 of ejector 100.

In step 360, the flow of hydrogen gases from the ejector is controlled. In an exemplary embodiment, the flow of hydrogen gases from ejector 100 is controlled through the movement of needle 140. The flow is controlled to match the reaction rate of fuel cell 210.

Step 360 may be performed through the use of pressure sensor 230 and ejector control unit 240, as described above. In an exemplary embodiment, pressure sensor 230 senses a pressure of the flow of hydrogen gases from ejector 100 to the gas inlet 212 of fuel cell 210. Ejector control unit 240 controls the flow of hydrogen gases from ejector 100 by operating motor 190 to axially move needle 140, based on the sensed pressure from pressure sensor 230. In particular, ejector control unit 240 may control the flow of hydrogen gases to match the reaction rate of fuel cell 210.

It may be desirable that closed loop fuel cell system 200 have positive hydrogen gas pressure relative to the surrounding ambient air. This allows the hydrogen gas to leak out of the system, rather than allowing air to leak into the system. Fuel cell system 200 is constructed such that the only way for hydrogen to leave the system 200 (except by a periodically operated purge valve) is for it to react in fuel cell 210. Accordingly, the primary nozzle opening 122 is optimally controlled through movement of needle 140 so that the flow of hydrogen gas from ejector 100 matches the reaction rate of fuel cell 210. Otherwise, hydrogen may build up in or be depleted from the closed loop, causing a pressure differential that can damage fuel cell membranes.

Accordingly, ejector control unit 240 may be programmed to adjust the position of needle 140 based on the difference in pressure from the predetermined ideal pressure dictated by the fuel cell 210. Ejector control unit 240 may further include a control algorithm with an integral windup limiter, in order to reduce pressure overshoot following large step changes in pressure command or reaction rate, and a pressure error dead band, to reduce hunting caused by electrical noise and pressure sensor hysteresis.

Method 300 is not limited to the above steps, but may include alternative steps and additional steps, as would be understood by one of ordinary skill in the art from the description herein.

For one example, as described above, fuel cell system 200 may include separator 260 and purge valve 270. These components are particularly important when step 330 comprises discharging both the excess hydrogen gas and a portion of water mixed with the excess hydrogen gas. In this embodiment, method 300 may further include the steps of separating the water from the excess hydrogen gas with separator 260, and removing the separated water from system 200 with purge valve 270.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A variable flow rate ejector comprising:
a primary inlet configured to be connected to a first fluid source at a first pressure, the primary inlet opening into a first inlet chamber;
a primary nozzle defining an opening at an end thereof, the primary nozzle connected to receive the first fluid from the first inlet chamber and transmit a flow of the first fluid through the primary nozzle opening;
a needle disposed within the primary nozzle opening and having a tapered portion, the tapered portion of the needle having a length greater than a largest diameter of the needle, the needle axially movable in order to vary an area between the tapered portion of the needle and primary nozzle opening, the primary nozzle opening and the needle sized to cause the first fluid to flow through the primary nozzle at supersonic speed when the first fluid source is connected to the primary inlet at the first pressure;
a secondary inlet configured to be connected to a second fluid source at a second pressure lower than the first pressure, the secondary inlet opening into a second inlet chamber positioned outside the primary nozzle opening, the second inlet chamber disposed so that when the second fluid source is connected to the secondary inlet at the second pressure, at least a portion of the second fluid is entrained in the flow of the first fluid from the primary nozzle, thereby creating a flow of the first and second fluids as a combined fluid; and
a secondary nozzle defining another opening downstream of the primary nozzle opening, the secondary nozzle opening sized to cause subsonic flow of the combined fluid through the secondary nozzle opening,
wherein an axial distance from an outermost edge of the primary nozzle opening to a narrowest portion of the secondary nozzle opening is less than a diameter of the narrowest portion of the secondary nozzle opening.

2. The variable flow rate ejector of claim 1, wherein the secondary nozzle opening has a diameter from one to five times a diameter of the primary nozzle opening.

3. The variable flow rate ejector of claim 2, wherein the subsonic speed of the combined fluid through the secondary nozzle is approximately 90% of Mach 1.

4. The variable flow rate ejector of claim 1, further comprising a diffuser positioned downstream of the secondary nozzle opening, the diffuser configured to discharge the flow of the first and second fluids at a pressure greater than the second pressure.

5. The variable flow rate ejector of claim 4, wherein the diffuser comprises a tapered portion that widens in the direction of the flow of the first and second fluids.

6. The variable flow rate ejector of claim 4, wherein the secondary nozzle comprises a constant-width throat portion extending between the secondary nozzle opening and the diffuser.

7. The variable flow rate ejector of claim 6, wherein the throat portion has a length of at least approximately six times a diameter of the throat portion.

8. The variable flow rate ejector of claim 1, further comprising means for axially moving the needle.

9. The variable flow rate ejector of claim 8, wherein the means for axially moving the needle comprises an electric stepper motor.

10. The variable flow rate ejector of claim 1, further comprising the first fluid source connected to the primary inlet at the first pressure and the second fluid source connected to the secondary inlet at the second pressure.

11. The variable flow rate ejector of claim 10, further comprising:
 means for axially moving the needle;
 a pressure sensor disposed downstream of the ejector secondary nozzle;
 an ejector control unit in communication with the pressure sensor and the means for axially moving the needle, the ejector control unit configured to axially move the ejector needle to maintain fluid flow from the ejector at a predetermined pressure based on pressure sensed by the pressure sensor.

12. A closed-loop fuel cell system comprising:
 a fuel cell having an anode circuit, a gas inlet, and a gas outlet; and
 the variable flow rate ejector of claim 1, the primary inlet of the ejector connected to a hydrogen storage system to receive a high pressure hydrogen gas, the secondary inlet of the ejector connected to the gas outlet of the fuel cell to receive a low pressure hydrogen gas, the secondary nozzle of the ejector connected to discharge a flow of the hydrogen gases to the gas inlet of the fuel cell.

13. The closed loop fuel cell system of claim 12, further comprising:
 a pressure sensor disposed between the ejector and the gas inlet of the fuel cell, the pressure sensor operable to sense a pressure of the flow of the hydrogen gases to the gas inlet of the fuel cell.

14. The closed-loop fuel cell system of claim 13, further comprising:
 an ejector control unit in communication with the pressure sensor and the ejector, the ejector control unit configured to axially move the ejector needle to maintain the flow of the hydrogen gases from the ejector to the gas inlet of the fuel cell at a predetermined pressure based on the sensed pressure.

15. The closed loop fuel cell system of claim 12, further comprising:
 a separator disposed between the gas outlet of the fuel cell and the second inlet of the ejector, the separator configured to separate water from the low pressure hydrogen gas; and
 a purge valve connected to the separator, the purge valve configured to remove the separated water from the system.

16. A method for recirculating hydrogen gas inside a fuel cell system, the method comprising the steps of:
 operating the fuel cell system of claim 12;
 generating with the anode circuit a greater quantity of hydrogen gas than is required by a reaction rate of the fuel cell;
 discharging from the gas outlet of the fuel cell an excess quantity of hydrogen gas;
 supplying the high pressure hydrogen gas to the primary inlet of the ejector;
 supplying the excess quantity of hydrogen gas to the secondary inlet of ejector; and
 controlling the flow of the hydrogen gases from the ejector to the gas inlet of the fuel cell to match the reaction rate of the fuel cell.

17. The method of claim 16, further comprising the step of:
 sensing a pressure of the flow of the hydrogen gases from the ejector to the gas inlet of the fuel cell.

18. The method of claim 17, wherein the controlling step comprises:
 controlling the flow of the hydrogen gases from the ejector to the gas inlet of the fuel cell by axially moving the ejector needle based on the sensed pressure of the flow of the hydrogen gases.

19. The method of claim 16, wherein the discharging step comprises:
 discharging from the gas outlet of the fuel cell a mixture of the excess quantity of hydrogen gas and water;
 and further comprising the steps of:
 separating the water from the excess hydrogen gas; and
 removing the separated water from the system.

* * * * *

UNITED STATES PATENT AND TRADEMARK OFFICE
CERTIFICATE OF CORRECTION

PATENT NO.         : 9,719,529 B2
APPLICATION NO.    : 13/983676
DATED              : August 1, 2017
INVENTOR(S)        : Douglas Brunner et al.

Page 1 of 1

It is certified that error appears in the above-identified patent and that said Letters Patent is hereby corrected as shown below:

On the Title Page

(75) Inventors: "Manish W. Bajpai" should be --Manish Bajpai--

Signed and Sealed this
Sixteenth Day of October, 2018

Andrei Iancu
*Director of the United States Patent and Trademark Office*